US012655672B2

(12) United States Patent (10) Patent No.: US 12,655,672 B2

Nania (45) Date of Patent: Jun. 16, 2026

(54) HINGE ASSEMBLY FOR POWERED TAILGATE

(71) Applicant: Ford Global Technologies, LLC, Dearborn, MI (US)

(72) Inventor: Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/934,337

(22) Filed: Nov. 1, 2024

(65) Prior Publication Data

US 2026/0125940 A1 May 7, 2026

(51) Int. Cl.
E05F 15/611 (2015.01)
B62D 33/027 (2006.01)

(52) U.S. Cl.
CPC ........ E05F 15/611 (2015.01); *B62D 33/0273* (2013.01); *E05Y 2201/214* (2013.01); *E05Y 2900/544* (2013.01)

(58) Field of Classification Search
CPC ............................ E05F 15/611; B62D 33/0273
See application file for complete search history.

(56) References Cited

U.S. PATENT DOCUMENTS

| | | | | |
|---|---|---|---|---|
| 677,883 | A | * | 7/1901 | Neider .................. F16B 41/002 |
| | | | | 470/41 |
| 7,549,691 | B2 | | 6/2009 | Schulte et al. |

| | | | | |
|---|---|---|---|---|
| 9,234,378 | B2 | | 1/2016 | Hansen |
| 10,293,868 | B2 | * | 5/2019 | Jergess ................. B62D 33/037 |
| 12,030,557 | B2 | | 7/2024 | Sukhdeo et al. |
| 2008/0252094 | A1 | * | 10/2008 | Schulte .............. B62D 33/0273 |
| | | | | 296/57.1 |
| 2013/0278004 | A1 | * | 10/2013 | Sackett .............. B62D 33/0273 |
| | | | | 296/57.1 |
| 2017/0274869 | A1 | * | 9/2017 | Da Deppo .............. B60R 25/00 |
| 2018/0251164 | A1 | | 9/2018 | Jergess et al. |
| 2019/0211598 | A1 | | 7/2019 | Hemphill et al. |
| 2020/0040628 | A1 | | 2/2020 | Trentin et al. |
| 2020/0047821 | A1 | | 2/2020 | Santana et al. |
| 2020/0399943 | A1 | * | 12/2020 | Ulewicz ............. B62D 33/0273 |
| 2023/0055414 | A1 | * | 2/2023 | Sukhdeo .............. B62D 33/037 |
| 2025/0263959 | A1 | * | 8/2025 | Srikrishna .......... B62D 33/0273 |

FOREIGN PATENT DOCUMENTS

| | | | |
|---|---|---|---|
| JP | H07115267 | B2 | 12/1995 |
| JP | 3907117 | B2 | 4/2007 |
| JP | 4031955 | B2 | 1/2008 |

* cited by examiner

*Primary Examiner* — Gregory J Strimbu

(74) *Attorney, Agent, or Firm* — Vichit Chea; Carlson, Gaskey & Olds, P.C.

(57) ABSTRACT

An assembly may include a drive rod projecting from a powered tailgate. The assembly may also include a drive rod support mounted to a vehicle body structure. Further, an outer surface of the drive rod may be configured to mate with an inner surface of the drive rod support in a manner that will not result in rotational motion being transferred between the drive rod and the drive rod support.

12 Claims, 5 Drawing Sheets

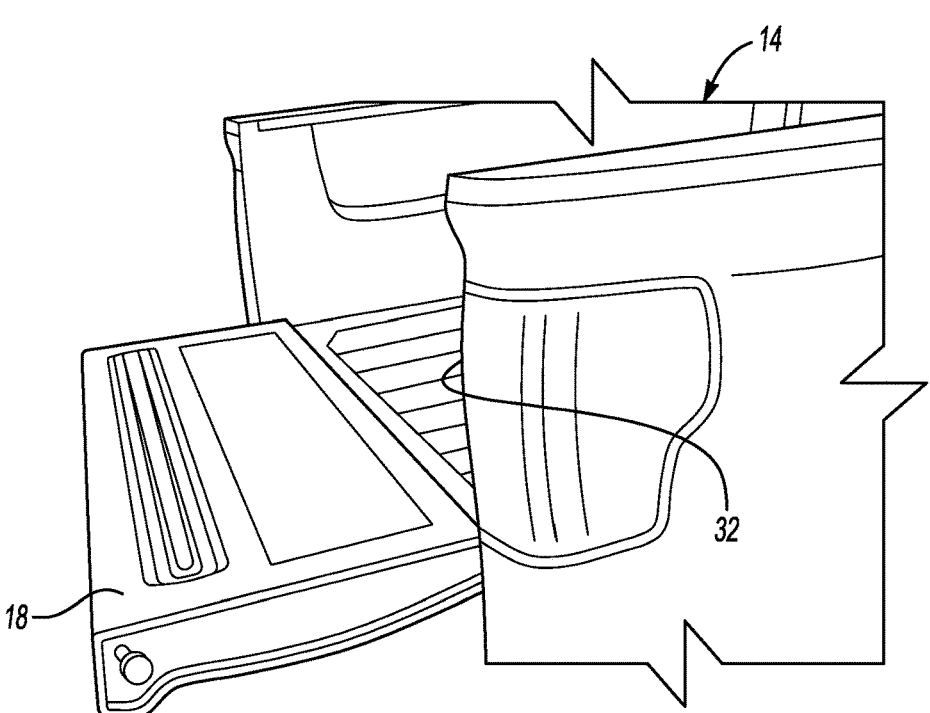
_Fig-2_
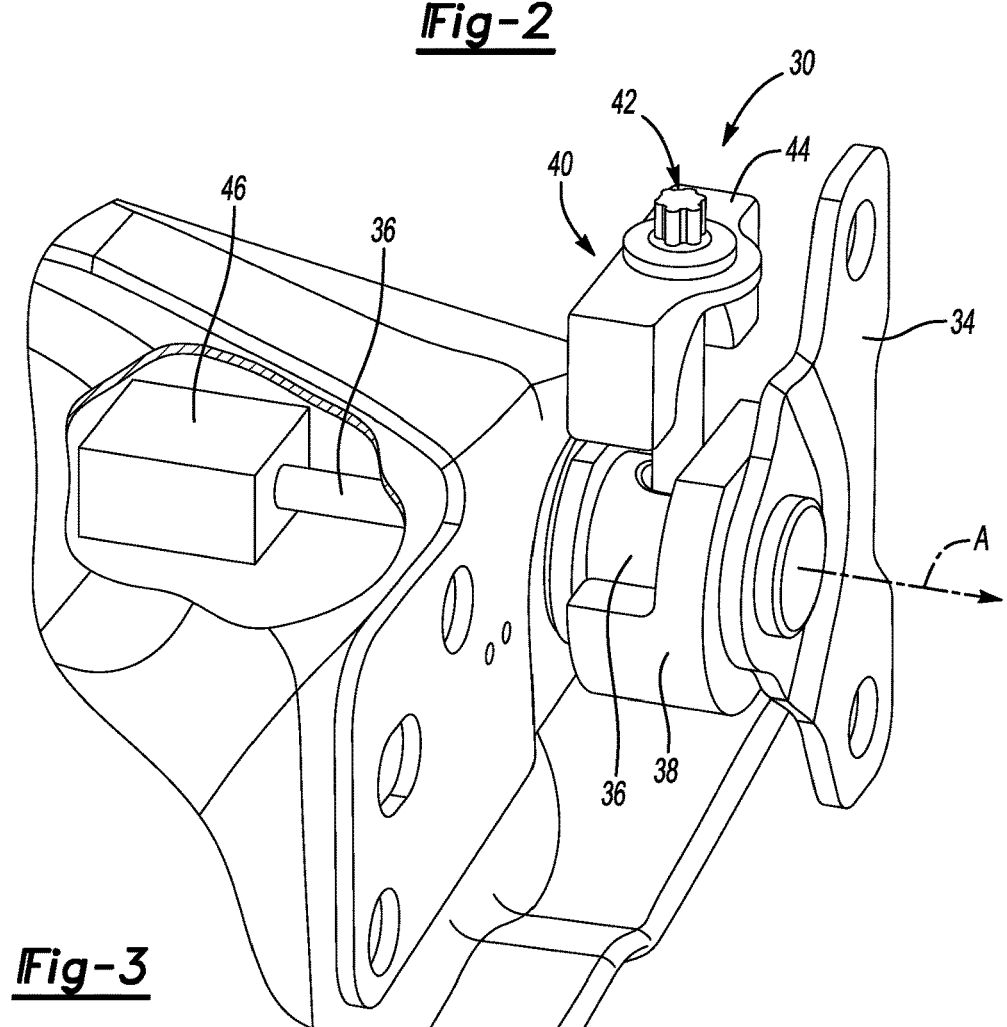
_Fig-3_

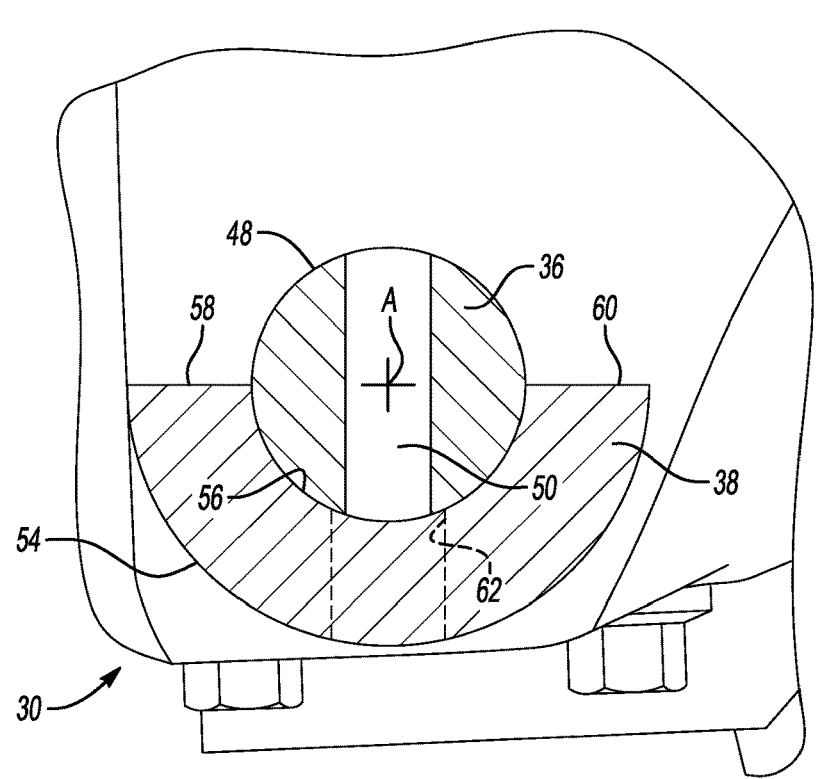
_Fig-6_
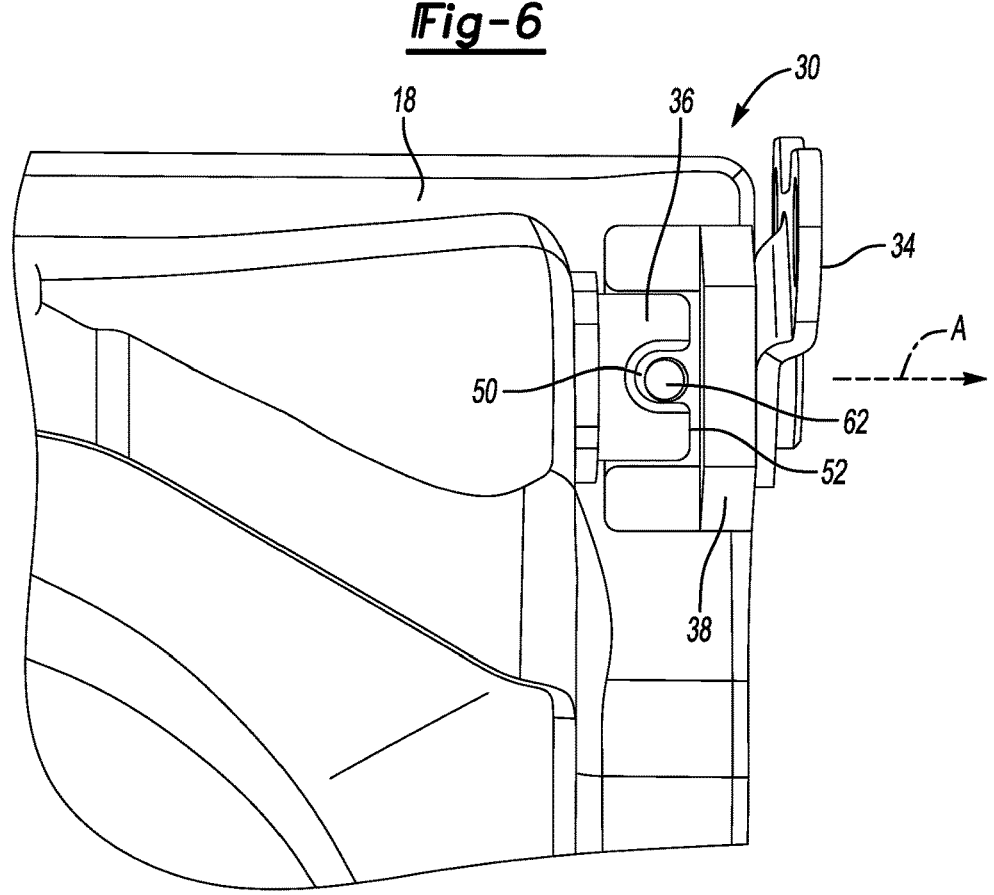
_Fig-7_

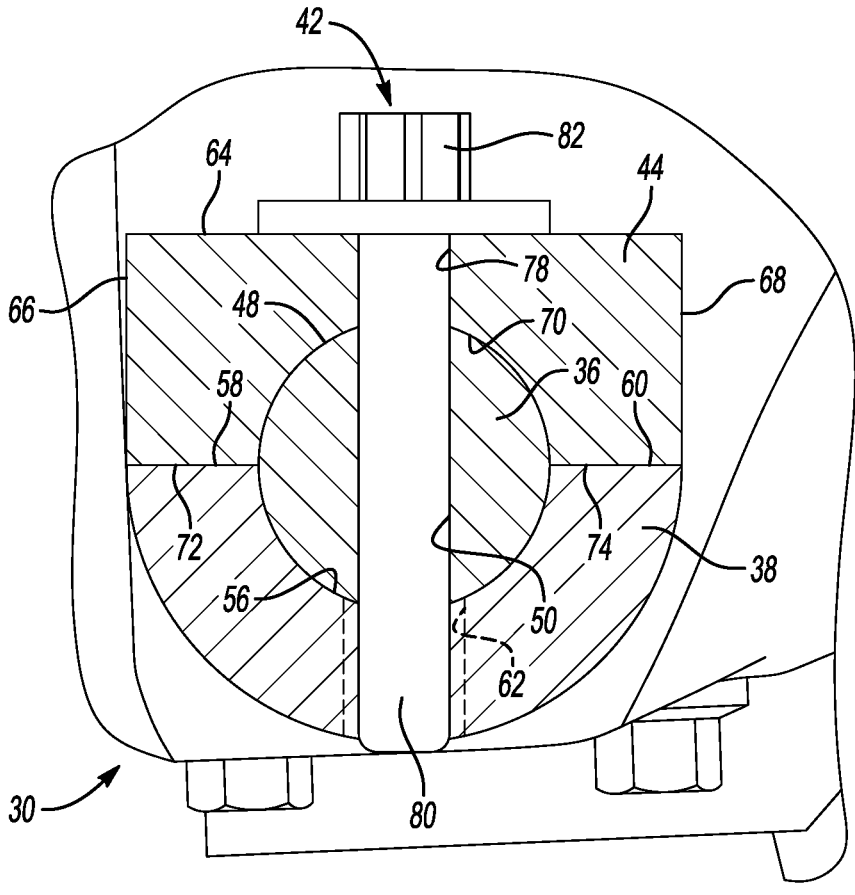
<u>*Fig-8*</u>

HINGE ASSEMBLY FOR POWERED TAILGATE

TECHNICAL FIELD

This disclosure relates to a hinge assembly for a powered tailgate.

BACKGROUND

Pickup trucks typically include a tailgate that swings between an upright, closed position and a horizontal, open position. Some pickup trucks may include powered tailgate assemblies, which include tailgates moved between the open and closed positions by one or more automated mechanisms.

SUMMARY

In some aspects, the techniques described herein relate to an assembly for a motor vehicle, including: a drive rod projecting from a powered tailgate; and a drive rod support mounted to a vehicle body structure, and wherein an outer surface of the drive rod is configured to mate with an inner surface of the drive rod in a manner that will not result rotational motion being transferred between the drive rod and the drive rod support.

In some aspects, the techniques described herein relate to an assembly, wherein an outer surface of the drive rod is configured to mate with an outer surface of the drive rod such that the drive rod is rotatable relative to the drive rod support.

In some aspects, the techniques described herein relate to an assembly, wherein: the outer surface of the drive rod is substantially circular-shaped in cross-section, and the inner surface of the drive rod support defines a recess exhibiting a shape substantially corresponding to the outer surface of the drive rod.

In some aspects, the techniques described herein relate to an assembly, wherein the inner surface of the drive rod support is substantially semi-circular in cross-section.

In some aspects, the techniques described herein relate to an assembly, wherein the inner surface of the drive rod support is configured to support the drive rod such that the drive rod and powered tailgate can rotate relative to the drive rod support as the powered tailgate moves between an open and a closed position.

In some aspects, the techniques described herein relate to an assembly, further including: a lock assembly configurable between a locked condition and an unlocked condition, wherein, when the lock assembly is in the locked condition, the lock assembly is configured to connect the drive rod and the drive rod support such that relative rotation between the drive rod and the drive rod support is prevented.

In some aspects, the techniques described herein relate to an assembly, wherein, when the lock assembly is in the locked condition, activation of a drive unit within the powered tailgate results in rotation of the powered tailgate relative to the vehicle body structure.

In some aspects, the techniques described herein relate to an assembly, wherein, when the lock assembly is in the unlocked condition, the drive rod is rotatable relative to the drive rod support.

In some aspects, the techniques described herein relate to an assembly, wherein the lock assembly includes a fastener configured to connect the drive rod and the drive rod support.

In some aspects, the techniques described herein relate to an assembly, wherein, when the lock assembly is in the locked condition, the fastener passes through a slot in the drive rod and a through-opening in the drive rod support.

In some aspects, the techniques described herein relate to an assembly, wherein: the lock assembly includes a collar, the collar includes an outer surface and an inner surface, and the outer surface is configured to interface with a head of the fastener.

In some aspects, the techniques described herein relate to an assembly, wherein the collar includes a through-opening configured to align with the slot of the drive rod and the through-opening of the drive rod support.

In some aspects, the techniques described herein relate to an assembly, wherein the powered tailgate includes a drive unit, and wherein the drive rod projects from the drive unit.

In some aspects, the techniques described herein relate to an assembly, wherein the drive rod support is rigidly coupled to the vehicle body structure such that the drive rod support is prevented from rotating relative to the vehicle body structure.

In some aspects, the techniques described herein relate to an assembly, wherein the powered tailgate is moveable between an open position and a closed position by rotation about a longitudinal axis of the drive rod.

In some aspects, the techniques described herein relate to an assembly for a motor vehicle, including: a powered tailgate including a drive unit and a drive rod projecting from the drive unit; a vehicle body structure, wherein the powered tailgate is rotatable relative to the vehicle body structure between an open position and a closed position about a longitudinal axis of the drive rod; a drive rod support mounted to the vehicle body structure, wherein an outer surface of the drive rod is configured to mate with an inner surface of the drive rod support in a manner that will not result rotational motion being transferred between the drive rod and the drive rod support, wherein the drive rod support is rigidly coupled to the vehicle body structure such that the drive rod support is prevented from rotating relative to the vehicle body structure; and a lock assembly configurable between a locked condition and an unlocked condition, wherein, when the lock assembly is in the locked condition, the lock assembly is configured to connect the drive rod and the drive rod support such that relative rotation between the drive rod and the drive rod support is prevented and such that activation of the drive unit results in rotation of the powered tailgate relative to the vehicle body structure, and wherein, when the lock assembly is in the unlocked condition, the drive rod is rotatable relative to the drive rod support.

In some aspects, the techniques described herein relate to an assembly, wherein: the outer surface of the drive rod is substantially circular-shaped in cross-section, and the inner surface of the drive rod support defines a recess exhibiting a shape substantially corresponding to the outer surface of the drive rod.

In some aspects, the techniques described herein relate to an assembly, wherein, when the lock assembly is in the unlocked position, the inner surface of the drive rod support is configured to support the drive rod such that the drive rod and powered tailgate can rotate relative to the drive rod support as the powered tailgate moves between an open and a closed position.

In some aspects, the techniques described herein relate to a method, including: manually rotating a powered tailgate relative to a vehicle body structure when a drive rod projecting from the powered tailgate is mated with a drive rod support mounted to the vehicle body structure.

In some aspects, the techniques described herein relate to a method, further including connecting the drive rod and the drive rod support using a lock assembly such that relative rotation between the drive rod and the drive rod support is prevented.

BRIEF DESCRIPTION OF THE DRAWINGS

FIG. 2 illustrates a rear-perspective view of a portion of the pickup truck of FIG. 1 with the tailgate in a fully open position.

FIG. 3 illustrates a perspective view of an assembly for use with the tailgate.

FIG. 6 is a cross-sectional view along line 5-5 showing additional detail of an example interface between a drive rod and a drive rod support.

FIG. 7 is a top view of the assembly with the lock assembly in the unlocked condition, and with the lock assembly removed from the assembly.

FIG. 8 is a cross-sectional view along line 8-8 showing additional detail of an example interface between the drive rod, drive rod support, and the lock assembly.

DETAILED DESCRIPTION

This disclosure relates to a hinge assembly for a powered tailgate. Among other benefits, this disclosure permits a user to manually rotate the powered tailgate while the powered tailgate is in an assembled or near-assembled position, but before the drive unit is fully connected. In this way, the user can manually rotate the powered tailgate without needing to overcome the resistance of the drive unit, which is beneficial during the vehicle assembly process, and in particular during assembly and alignment of the powered tailgate.

Figure 1:
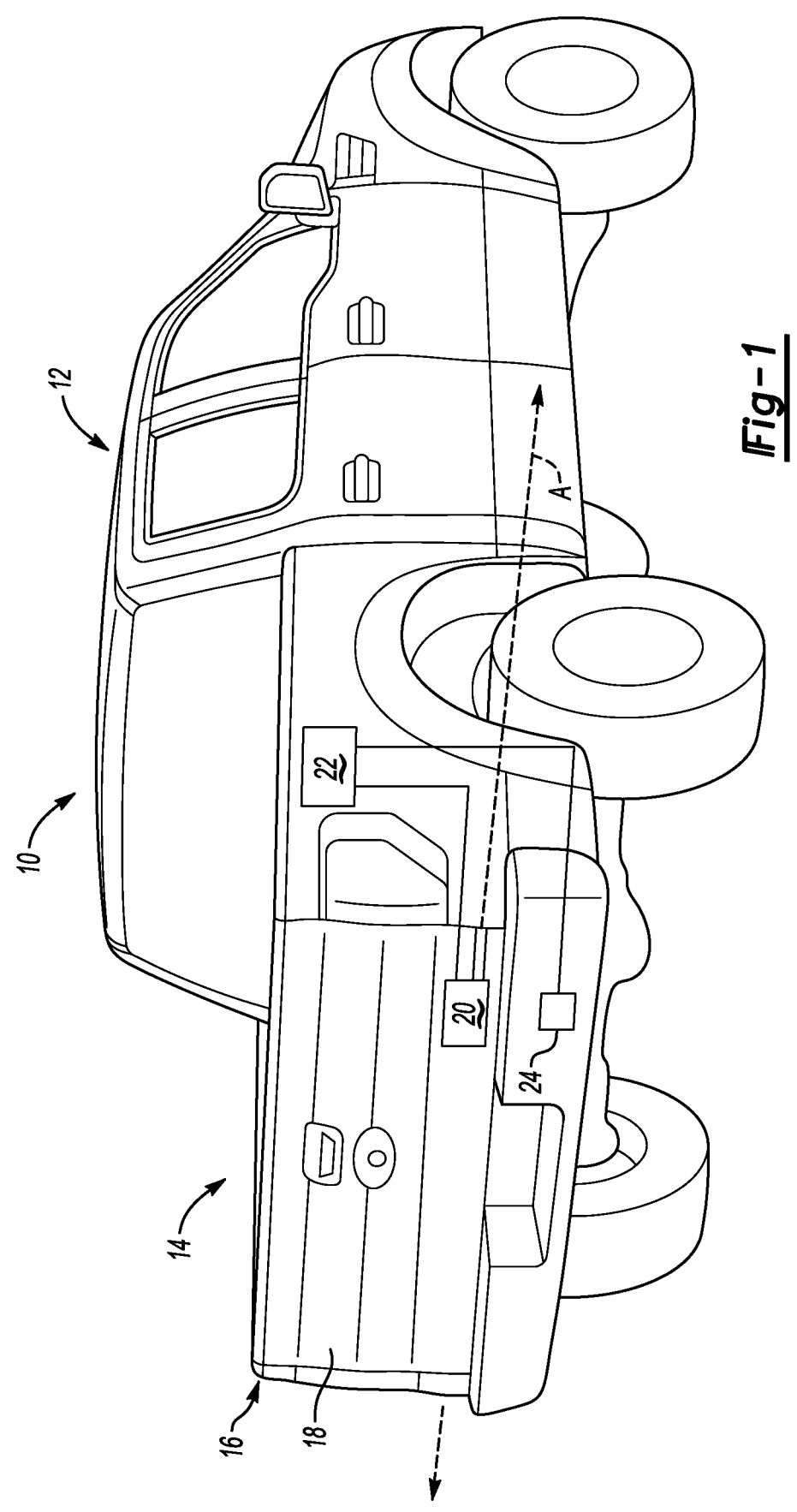
FIG. 1 illustrates a rear-perspective view of a motor vehicle, which, in this example, is a pickup truck with a tailgate in a fully closed position.

FIG. 1 illustrates a motor vehicle 10 ("vehicle 10"), which in this example is a pickup truck. The vehicle 10 includes a passenger cabin 12 and a cargo box 14. The vehicle further includes a powered tailgate assembly 16, which includes a tailgate 18 rotatable about the hinge adjacent the vertical bottom of the tailgate 18. The tailgate 18 may be referred to as a powered tailgate.

While references made herein to a "powered tailgate assembly," certain aspects of this disclosure may apply to other types of powered closure assemblies. Further, this disclosure is not limited to pickup trucks and extends to other types of vehicles that may include a powered tailgate or closure assemblies.

The tailgate 18 is configured to move between a fully closed position (FIG. 1) and a fully opened position (FIG. 2). The powered tailgate assembly 16 further includes an actuator 20 mechanically coupled to the tailgate 18. The actuator 20 is configured to rotate the tailgate 18 throughout a range of positions between the fully closed and fully opened positions.

The actuator 20 is electrically coupled to a controller 22, and is responsive to instructions, or commands, from the controller 22. The powered tailgate assembly 16 may also include one or more sensors 24 that provide information to the controller 22. The sensors 24 may be configured to generate signals indicative of a position of the tailgate 18. The sensors 24 could be provided by sensors that already exist on the vehicle 10, such as cameras. Alternatively, the powered tailgate assembly 16 could include its own dedicated sensors. While the sensor is shown schematically in FIG. 1, it should be understood that this disclosure is not limited to any particular sensor type.

The controller 22 is also shown schematically in FIG. 1. However, it should be understood that the controller 22 can be part of an overall vehicle module, such as vehicle system controller (VSC), or could alternately be a standalone controller separate from the VSC. Further, the controller may be programmed with executable instructions for interfacing with and operating the various components of the vehicle 10. The controller 22 additionally includes a combination of hardware and software and further includes a processing unit and non-transitory memory for executing the various control strategies and modes of the vehicle system.

While FIGS. 1 and 2 illustrate the tailgate 18 in fully closed and fully open positions, respectively, the tailgate 18 is moveable to a plurality of positions between the fully closed and fully opened positions. Specifically, the actuator 20, in response to instructions from the controller 22, is configured to rotate the tailgate 18 to a plurality of intermediate positions between a fully closed and fully opened positions. The controller 22 is also configured to monitor conditions and positions of the tailgate 18 in order to manage movement of the tailgate 18.

The tailgate 18 is pivotably coupled to the vehicle 10. The tailgate 18 can pivot between the open and closed positions about an axis A. An example hinge assembly 30 facilitating this pivoting motion of the tailgate 18 will now be described.

FIGS. 3-8 illustrate a hinge assembly 30 that pivotably couples the tailgate 18 to a vehicle body structure 32 (FIG. 2), which may be a pillar in a body of the vehicle 10 adjacent the tailgate 18. The hinge assembly 30 includes a mounting bracket 34, a drive rod 36, and a drive rod support 38. The hinge assembly 30 is configured to selectively attach and detach from a lock assembly 40, which includes a fastener 42 and a collar 44, in this example. The hinge assembly 30, either with or without the lock assembly 40 and/or portions of the tailgate 18 and the vehicle body structure 32, may be referred to as an assembly.

The hinge assembly 30 is used in connection with the actuator 20 to move the tailgate 18 back and forth between the fully closed position of FIG. 1 and the fully opened position of FIG. 2. The hinge assembly 30 is on the passenger side of the tailgate 18 in this example. Another hinge assembly (not shown) may be located at an opposite, driver side of the tailgate 18. The other hinge assembly pivotably couples the tailgate 18 to a vehicle body structure on an opposite side of the vehicle 10. The other hinge assembly may, or may not, accommodate a drive rod from a drive unit.

The actuator 20 includes a drive unit 46 and the drive rod 36. The drive unit 46, in this example, lacks any sort of clutch, such as an electromagnetic clutch, that can selectively couple and decouple the drive unit 46 from the drive rod 36. The drive unit 46 resides within an interior of the tailgate 18, as shown in FIG. 3, in which the tailgate 18 is partially cutaway to show the drive unit 46. A portion of the drive rod 36 and is able to mate with the drive rod support 38. The interface between the drive rod 36 and the drive rod support 38 will be discussed in more detail below. The drive rod 36 may include one portion arranged within the tailgate 18 and another portion projecting outward of the tailgate 18. The drive rod 36 may include multiple parts, such as a first part within the tailgate 18 rigidly connected to another part arranged outside the tailgate 18.

The mounting bracket 34 is fixed to the vehicle body structure 32 with, for example, mechanical fasteners. The drive rod support 38 is rigidly secured to the mounting bracket 34. The drive rod support 38 is not rotatable relative to the mounting bracket 34 or the vehicle body structure 32.

Figures 4, 5:
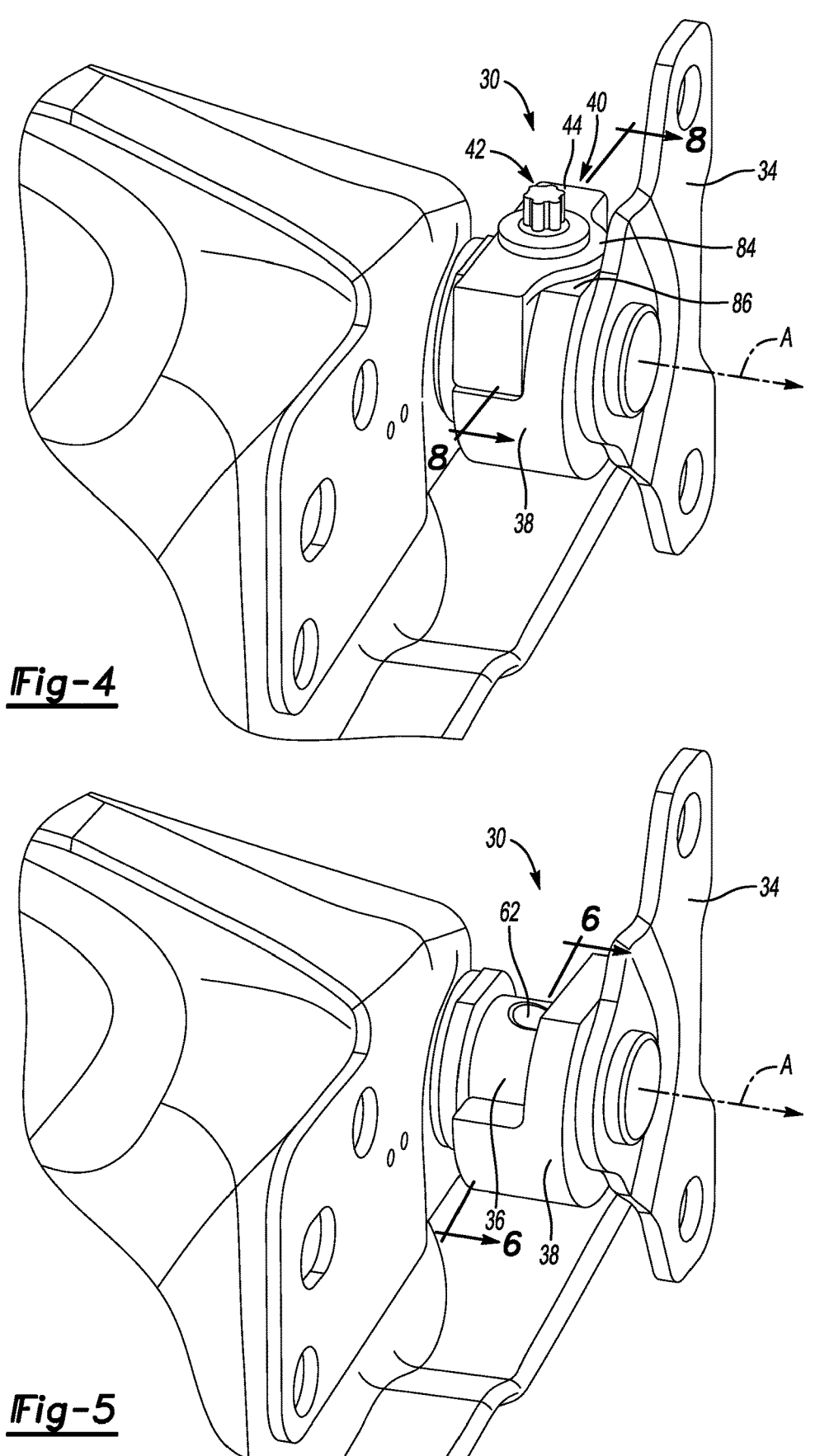
FIG. 4 illustrates a perspective view of the assembly with a lock assembly in a locked condition.
FIG. 5 illustrates a perspective view of the assembly with the lock assembly in an unlocked condition, and with the lock assembly removed from the assembly.

To move the tailgate 18, when the lock assembly 40 is in a locked condition, as in FIG. 4, the drive unit 46 is activated by the controller 22 to cause the drive unit 46 to rotate relative to the drive rod 36. The drive unit 46 is rigidly secured to the tailgate 18. Thus, the rotation of the drive unit 46 rotates the tailgate 18 about axis A. Depending on the direction of rotation about the axis A, the tailgate 18 pivots toward, or away from, the fully closed position. The lock assembly 40 prevents rotation of the drive rod 36 when the lock assembly 40 is in the locked condition.

The lock assembly 40 is configurable between a locked condition (FIG. 4) and an unlocked condition (FIG. 5). In the unlocked condition, the lock assembly 40 is detached form the hinge assembly 30, and is not coupled to the hinge assembly 30.

FIG. 6 shows an example interface between the drive rod 36 and the drive rod support 38 when the lock assembly 40 is in the unlocked condition and not coupled to the hinge assembly 30. The portion of the drive rod 36 projecting from the tailgate 18 is substantially cylindrical, and exhibits an outer surface 48 that is substantially circular in cross-section. The drive rod 36 further includes a slot 50 formed in a free end 52 (FIG. 7) thereof. Alternatively, the drive rod 36 could include a through-opening instead of the slot 50. A longitudinal axis of the drive rod 36 is centered about axis A. As shown in FIG. 7, the free end 52 is spaced-apart from the drive rod support 38 in the left-to-right direction (i.e., relative to the orientation of FIG. 7) to permit cross-vehicle (i.e., in a direction perpendicular to the centerline of the vehicle 10) adjustments of the tailgate 18. Once the cross-vehicle position of the tailgate 18 is set, the lock assembly 40, when in the locked condition, holds the tailgate 18 in place to set the cross-vehicle position. The cross-vehicle adjustment does not require shims, in this example.

The drive rod support 38 includes an outer surface 54 facing away from the drive rod 36, and an inner surface 56 facing toward the drive rod 36. The drive rod support 38 further includes flats 58, 60 connecting the outer and inner surfaces 54, 56. The drive rod support 38 further includes a through-opening 62, which may be threaded. Inner surface 56 defines a recess exhibiting a shape substantially corresponding to the shape of the outer surface 48 of the drive rod 36. In this example, the outer surface 48 and inner surface 56 are configured to mate in a manner that will not result rotational motion being transferred between the drive rod 36 and the drive rod support 38. Further, the outer surface 48 and the inner surface 56 are configured to mate such that the drive rod 36 is rotatable relative to the drive rod support 38.

In this example, the inner surface 56 defines a semicircle in cross-section. In a particular example, the inner surface 56 is a circular arc that measures substantially 180° about axis A. The flats 58, 60 lie in a plane substantially parallel to a ground surface adjacent the vehicle 10 and passing through axis A, in this example. Further, in this example, the recess defined by the inner surface 56 is concave when viewed from a location vertically above the inner surface 56. In this way, the drive rod support 38 can support at least some of the weight of the tailgate 18 via contact with the drive rod 36. Further, the drive rod support 38 is able to support and retain the drive rod 36 as the drive rod 36 rotates while the tailgate 18 is rotated between the open and closed positions, namely when the lock assembly 40 is in the unlocked position and detached from the assembly 30, but while the tailgate 18 is positioned in an assembled location, or a near-assembled location (subject to minor adjustments in alignment) and while the drive unit 46 is not activated, in which the drive rod 36 is received in the recess defined by the inner surface 56. In this way, during assembly of the tailgate 18, a worker, for example, can manually raise and lower the tailgate 18, as needed to assemble and/or align the tailgate 18, without needing to overcome the resistance force of the drive unit 46.

When the vehicle 10 has progressed through the assembly process to the point where the tailgate 18 can be powered by the drive unit 46, a worker can install the lock assembly 40 relative to the drive rod 36 and drive rod support 38. In order to arrange the lock assembly 40 in the locked condition, the tailgate 18 is rotated such that the slot 50 is aligned with through-opening 62, as shown in FIG. 7. Next, the collar 44 is arranged relative to the drive rod 36 and the drive rod support 38, as generally shown in FIGS. 3 and 4.

As shown in FIG. 8, the collar 44 includes an upper surface 64, side surfaces 66, 68, an inner surface 70, and flats 72, 74 connecting the side surfaces 66, 68 and the inner surface 70. The flats 72, 74 are substantially parallel to the upper surface 64. Flats 72, 74 lie in a plane substantially parallel to flats 58, 60, and substantially parallel to a ground surface adjacent the vehicle 10 and passing through axis A, in this example. The inner surface 70 faces the drive rod 36 and is semicircular in cross-section. Specifically, the inner surface 70 defines a semicircle in cross-section. In a particular example, the inner surface 70 is a circular arc that measures substantially 180° about axis A. The inner surface 70 resembles inner surface 56, reflected about a horizontal plane passing through axis A and flats 58, 60, 72, 74. Together, inner surfaces 56, 70 completely encircle the outer surface 48. Inner surfaces 56, 70 and outer surface 48 are centered about axis A. The collar 44 may include serrations on inner surface 70 and/or the flats 72, 74 to prevent axial sliding of the tailgate 18 when the lock assembly is in the locked condition.

The collar 44 also includes a through-opening 78, extending between upper surface 64 and inner surface 70. The through-opening 78 is able to align with the slot 50 and the through-opening 62. When aligned, a shank 80 of fastener 42 is insertable through through-opening 78, slot 50, and at least partially into through-opening 62. The shank 80 may be threaded and may couple to the threads within through-opening 62. The shank 80 may project beyond through-opening and couple to a bolt, in another example. The head 82 of the fastener 42 is configured to rest against upper surface 64. Upper surface 64 may include a tab 84 projecting laterally from a remainder of the upper surface 64 and configured to engage a flat 86 of the drive rod support 38, which is spaced-apart laterally and vertically from flats 58, 60.

When the lock assembly 40 is in the locked condition, the drive rod 36 and the drive rod support 38 are connected by the lock assembly 40 such that relative rotation between the drive rod 36 and the drive rod support 38 is prevented. Further, because the drive rod support 38 is not rotatable relative to the vehicle body structure 32, neither the drive rod 36 nor the drive rod support 38 are rotatable when the lock assembly 40 is in the locked condition.

It should be understood that terms such as "about," "substantially," and "generally" are not intended to be boundaryless terms, and should be interpreted consistent with the way one skilled in the art would interpret those terms. Further, directional terms such as "upper," "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An assembly for a motor vehicle, comprising:
a drive rod projecting from a powered tailgate; and
a drive rod support mounted to a body structure of the motor vehicle, wherein an outer surface of the drive rod is configured to mate with an inner surface of the drive rod support in a manner that will not result in rotational motion being transferred between the drive rod and the drive rod support, and wherein the body structure is adjacent to the powered tailgate; and
a lock assembly configurable between a locked condition and an unlocked condition, wherein, when the lock assembly is in the locked condition, the lock assembly is configured to connect the drive rod and the drive rod support such that relative rotation between the drive rod and the drive rod support is prevented, wherein the lock assembly includes a fastener configured to connect the drive rod and the drive rod support, wherein, when the lock assembly is in the locked condition, the fastener passes through a slot in the drive rod and a through-opening in the drive rod support, wherein the lock assembly includes a collar, wherein the collar includes an outer surface and an inner surface, wherein the outer surface of the collar is configured to interface with a head of the fastener, wherein the collar includes a flat extending between the outer surface of the collar and the inner surface of the collar, wherein the drive rod support includes a flat, and wherein, when the lock assembly is in the locked condition, the flat of the collar lies in a plane substantially parallel to the flat of the drive rod support.

2. The assembly as recited in claim 1, wherein the outer surface of the drive rod is configured to mate with the inner surface of the drive rod support such that the drive rod is rotatable relative to the drive rod support.

3. The assembly as recited in claim 2, wherein:
the outer surface of the drive rod is substantially circular-shaped in cross-section, and
the inner surface of the drive rod support defines a recess exhibiting a shape substantially corresponding to the outer surface of the drive rod.

4. The assembly as recited in claim 3, wherein the shape of the inner surface of the drive rod support is substantially semi-circular in cross-section.

5. The assembly as recited in claim 3, wherein the inner surface of the drive rod support is configured to support the drive rod such that the drive rod and the powered tailgate can rotate relative to the drive rod support as the powered tailgate moves between an open position and a closed position.

6. The assembly as recited in claim 1, wherein, when the lock assembly is in the locked condition, activation of a drive unit within the powered tailgate results in rotation of the powered tailgate relative to the body structure.

7. The assembly as recited in claim 1, wherein, when the lock assembly is in the unlocked condition, the drive rod is rotatable relative to the drive rod support.

8. The assembly as recited in claim 1, wherein the collar includes a through-opening configured to align with the slot of the drive rod and the through-opening of the drive rod support.

9. The assembly as recited in claim 1, wherein:
the powered tailgate includes a drive unit,
the drive rod projects from the drive unit,
the drive rod support is rigidly coupled to the body structure such that the drive rod support is prevented from rotating relative to the body structure, and
the powered tailgate is moveable between an open position and a closed position by rotation about a longitudinal axis of the drive rod.

10. The assembly as recited in claim 1, wherein the body structure is a structure of the motor vehicle other than the powered tailgate.

11. The assembly as recited in claim 10, wherein the body structure is a pillar of the motor vehicle.

12. The assembly as recited in claim 1, wherein, when the lock assembly is in the locked condition, the flat of the collar is in direct contact with the flat of the drive rod support.

* * * * *